No. 770,557. Patented September 20, 1904.

UNITED STATES PATENT OFFICE.

COURTLAND W. BRUNSON, OF HAMILTON, OHIO.

COMPOSITION OF MATTER FOR ARTIFICIAL STONE.

SPECIFICATION forming part of Letters Patent No. 770,557, dated September 20, 1904.

Application filed April 18, 1904. Serial No. 203,764. (No specimens.)

*To all whom it may concern:*

Be it known that I, COURTLAND W. BRUNSON, a citizen of the United States, residing at Hamilton, Butler county, Ohio, have invented a new and useful Improvement in Compositions of Matter for Artificial Stone, of which the following is a specification.

My composition consists of the following ingredients combined in the proportion stated—viz., cinders or slag, (preferably vitrified,) ground and graded to one-fourth inch or less in size, thirty-five pounds; fine sand, fifteen pounds; barites, (barium sulfate,) powdered, one-half pound; cement, two pounds; slaked lime, (calcium oxid,) three pounds; water, sufficient to make thick slush.

The ingredients are to be thoroughly mingled in a pug-mill and reduced with sufficient water to form a thick slush, then molded into the desired forms and permitted to set or harden.

By the use of the above composition of matter the cinders, sand, and barites form a very dense base, owing to their particles being graduated to different respective sizes, which are bound intimately together by the action of the cement, lime, and water. The resultant mass being substantially non-porous and impervious to moisture is consequently very durable when exposed to the action of the elements.

Stone prepared in this manner is suitable for use in the construction of foundations or superstructures of buildings, bridge abutments or piers, and for other structural or ornamental purposes.

What I claim, and desire to secure by Letters Patent of the United States, is—

1. The herein-described composition of matter consisting of cinders, sand, barites, cement, lime and water, substantially as described and for the purpose specified.

2. The herein-described composition of matter for artificial stone, consisting of cinders thirty-five pounds, sand fifteen pounds, barites one-half pound, cement two pounds, lime three pounds, and water sufficient to make a thick slush, substantially as described.

COURTLAND W. BRUNSON.

Witnesses:
ALMA SCHWEINFEST,
R. S. CARR.